Jan. 4, 1966   E. H. K. MÜLLER ETAL   3,226,975
METHODS FOR TESTING MATERIALS FOR FAULTS
Filed Aug. 18, 1961   2 Sheets-Sheet 1

INVENTORS
Erich H. K. Müller
Eugen Peetz and
Reinhard Huber

Jan. 4, 1966  E. H. K. MÜLLER ETAL  3,226,975
METHODS FOR TESTING MATERIALS FOR FAULTS
Filed Aug. 18, 1961  2 Sheets-Sheet 2

3,226,975
**METHODS FOR TESTING MATERIALS
FOR FAULTS**
Erich H. K. Müller, Wolfenbüttel, and Eugen Peetz and Reinhard Huber, Salzgitter-Lebenstedt, Germany, assignors to Hüttenwerk Salzgitter Aktiengesellschaft, Salzgitter-Drutte, Germany, a body corporate of Germany
Filed Aug. 18, 1961, Ser. No. 132,461
Claims priority, application Germany, Aug. 20, 1960, H 40,256; July 18, 1961, H 43,162; July 20, 1961, H 43,185
5 Claims. (Cl. 73—67.2)

The known methods of testing workpieces for faults are difficult to apply to mass-produced goods of large surface area if the method is to be carried out quickly. The pieces to be examined often have good elastic properties and frequently also a permanent geometrical shape. Such specimens can be made to oscillate transversely and the nodal lines, the so-called "Chladnic sound patterns," occurring at resonance can be made visible by sprinkling sand on their top surface. Deformations of these sound patterns and deviations from their regular shape have already been interpreted as the consequence of faults in the body under examination. Thus, it is known from the literature that faults in material alter the position and shape of the nodal lines and the corresponding natural frequencies, and further that the nodal line patterns of tests pieces free from faults and disposed symmetrically to a main axis have a symmetrical shape but are unsymmetrical when there are faults in the test piece.

In spite of what is already known, it has not hitherto been possible to develop a technically useful method of testing whether materials are free from faults with the aid of transversal oscillations; this is the problem with which the present invention is concerned. In order to solve this problem, according to the invention, the workpiece to be examined is mounted or clamped symmetrically with respect to one of its main axes and set into resonance oscillation, the nodal lines of which run substantially at right angles to this main axis or axis of symmetry and are crossed by other nodal lines mostly in the vicinity of said axes.

The manner in which the method is carried out in practice will be described, in the first place, in connection with the examination of materials which possess at least one axis of symmetry and can oscillate freely at their edges except at the individual points or support. This applies particularly to the longitudinal edges of a finished sheet or plate which has been cut to rectangular shape. For the purpose of examination, the workpiece is mounted on supports or the like at a few places symmetrically to one of its main axes of symmetry, rectangular plates being preferably mounted symmetrically to their shorter main axis, that is to say their transverse axis. For the actual examination, selected resonance frequencies are used which are characterised by nodal lines which are particularly sensitive to faults, and for this purpose the test piece is caused to oscillate naturally in such a way that a number of nodal lines running in the same direction are produced on its surface, and run approximately at right angles to the direction of the selected axis of symmetry. In the case of a rectangular plate mounted symmetrically to its transverse axis, therefore, the nodal lines run substantially parallel to one another in the longitudinal direction of the plate. The resonance frequencies, in accordance with the invention, are further to be selected in such a way that the nodal lines are intersected by at most one nodal line at the locus of the axis of symmetry. The corresponding wave lengths, in the case when there are no crossing lines, are determined by the condition that the width of the rectangular plate is an integral multiple of the half wave length which itself is determined by the distance of the parallel nodal lines from one another. The frequencies of these selected resonance oscillations can be calculated, in accordance with classical theory, in simple cases from the dimensions of the test piece, its density and its elastic constants.

When a test piece which is free from faults oscillates in resonance with the selected frequency $f$, the corresponding nodal lines appear symmetrically on both sides of the symmetry axis of the test piece. When, therefore, such a nodal line pattern occurs simultaneously on both sides of the symmetry axis of the test piece, this is an indication that faulty places of an extent comparable with the half wave length of the oscillation are not present. In most cases the measurement is then completed and the test piece passed as sound.

If, on the other hand, the test piece is faulty there will not be a single resonance frequency $f$ but rather two separate frequencies $f_1$ and $f_2$ which correspond to two nodal line patterns which differ as hereinafter described from the nodal line pattern when the test piece is free from faults. In the case of the first resonance frequency $f_1$ the nodal line pattern is to be seen only on one side of the test piece and in the case of the second frequency $f_2$ only on the other side, the form of the nodal line pattern being a mirror image of that of the first pattern with respect to the axis of symmetry. On the opposite sides of the test piece usually no similar nodal lines or sometimes other or distorted nodal lines can be seen. Pronounced nodal lines, therefore, do not appear simultaneously on both sides of the symmetry axis of the test piece as in the case when it is free from faults but at different frequencies only on the one side or only on the other side of the test piece which is divided by the axis of symmetry. The relative difference of the two resonance frequencies $f_1$ and $f_2$, or the two times intervals for one cycle of oscillations, calculated on its average value, increases with increasing extent of fault and is thus a measurement or criterion of the existence and extent of the fault. Therefore, a test piece can be said to be free from fault when the relative difference between the two above-mentioned resonance frequencies is below a predetermined limiting value but is faulty when this value is exceeded.

Figure 1:
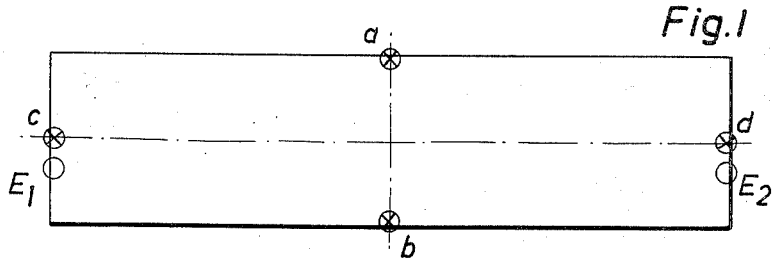
FIG. 1 is a diagrammatic plan view of a rectangular workpiece clamped for testing according to the invention.
Figure 2:
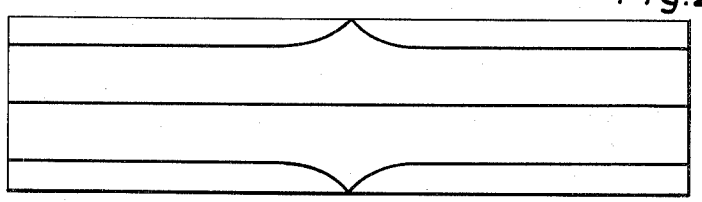
FIG. 2 shows in plan view nodal line formations on a rectangular workpiece free from faults and being tested in accordance with the method of the invention.

FIGURES 1–5 together illustrate an example of the method, in accordance with the invention, for testing a rectangular plate workpiece in a horizontal position and of which the transverse axis has been selected as the axis of symmetry. Whereas a small plate can be held or clamped for the purpose of testing at the point of intersection of the longitudinal axis with the transverse axis, for example by means of a magnet, a large plate is preferably mounted at several places symmetrically to its transverse axis, preferably at the points of intersection $a$ and $b$ of the transverse axis with the longitudinal edges and at further points $c$ and $d$ on its narrow edges, as illustrated in FIGURE 1. Oscillation generators $E_1$ and $E_2$ are attached to the narrow edges, namely at the antinodes of the nodal line pattern to be produced. In order to be able to observe the pattern, some sand is sprinkled uniformly over the plate. After this, the frequency of the oscillation generators $E_1$ and $E_2$ is continuously altered, for example by means of an alternating current generator, until it corresponds to the selected resonance frequency and the sheet is thereby set into intensive natural oscillation. The sand on the surface of the plate then shows a plurality of nodal lines which run in the longitudinal direction of the plate, for example three nodal lines as shown in FIGURE 2. The half wave length given by the distance apart of the nodal lines in this case amounts to one-third of the width of the plate. The nodal lines next to the edge, owing to the fixing of the edge at the points $a$ and $b$, which also represent nodal points are, therefore, deflected from their straight course towards these points which, however, owing to the symmetry with respect to the transverse axis has no influence on the measuring process. When the generators $E_1$ and $E_2$ are operated simultaneously, as in method 2 below, if the nodal line pattern occurs simultaneously and symmetrically on both sides of the symmetry axis, as in the present case, the plate is free from faults, of which the extent is comparable as regards its order of magnitude with the distance apart of the nodal lines.

Figure 3:
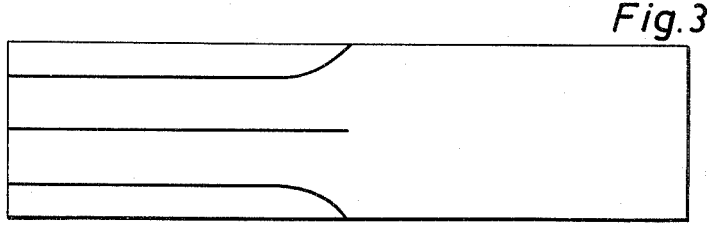
FIGS. 3 and 4 illustrate respectively different nodal patterns on opposite sides of the transverse axis of a rectangular workpiece being tested according to the method of the invention.
Figure 4:
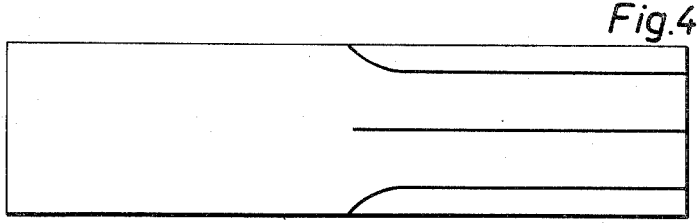
Figure 5:
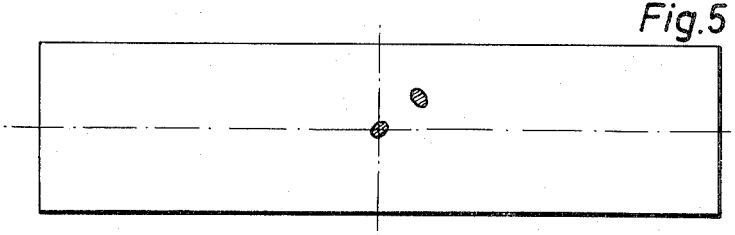
FIG. 5 illustrates in plan view the actual location of faults in a workpiece tested according to FIGS. 3 and 4.

FIGURES 3–5 show, as a practical example, a plate of the dimensions 4003 x 1008 x 20 mm. mounted in a similar manner but having faults. At a frequency of 295 Hertz, or a cycle of $3390 \times 10^{-3}$ secs. it was found that the resonance nodal line pattern appeared only on the left plate half as shown in FIGURE 3 and the pattern differs very sharply from that of FIG. 2, and at 297 Hertz or $3367 \times 10^{-3}$ secs. the resonance nodal line pattern appeared only on the right hand half of the plate as shown in FIGURE 4. The relative frequency and time-interval difference, calculated by dividing the absolute difference (2 Hertz) by the median (296 Hertz) of the two frequencies 295 Hertz and 297 Hertz, and multiplying the result by 100 to convert it to percent, amounted to 0.67% (6.7 per mil.).

The difference between the two measured resonance frequencies ($f_1$, $f_2$) as mentioned, serves as a criterion of the presence and size of defective places in the workpiece. In this case, it indicated faults of small thickness. Actually, a supersonic examination confirmed the measurement and, as shown in FIGURE 5, showed two faults of about 80 x 120 mm. extent. The production of resonance oscillations and the measuring of their frequencies at both halves of the plates, may be performed in various ways. Thus, both plate halves may be brought to oscillation either simultaneously or successively.

(1) In the first method, the production of oscillations and the measuring of their frequencies at each plate half occurs in succession, i.e., first at the one plate half (for example, left) and then at the other (for example right) plate half. This method of operation is characterized by the following steps A and B below and are indicated schematically in FIGS. 6 and 7.

A. Oscillation test at the left plate half, for example, as shown at the cross-hatched area in FIG. 6. At this plate half, for example, at the left narrow end according to FIG. 6, an oscillation exciter E is applied, which is fed via an amplifier A, by a generator G producing the frequency. The variable frequency at generator G is varied until the sought oscillation, which is characterized by a visible definite pattern of its nodal lines, is formed and indicated on the left plate half by the scattered sand. Thereafter, the frequency $f_1$ of this oscillation is measured, usually directly at the indicating instrument of the generator G or at an indicating device, which is connected to an oscillation receiver (not shown).

Figures 6, 7:
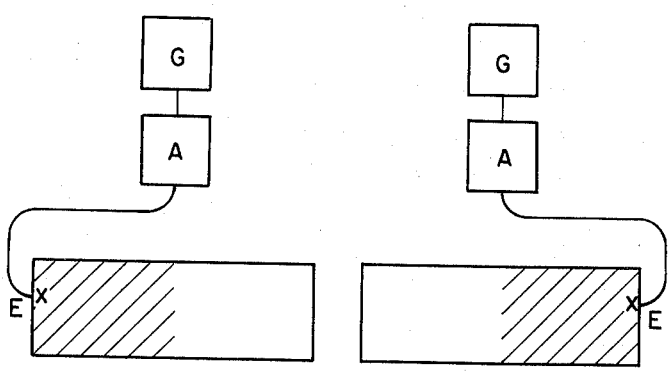
FIGS. 6 and 7 illustrate schematically a first method of connecting and operating exciters, namely, sequentially to a respective plate half.

B. After completion of the oscillation measuring at the left plate half, the exciter E is removed therefrom and applied at the right plate half. Thereafter occurs, analogous to step A above, the testing or examination of the oscillation at this right plate half (FIG. 7, cross-hatched area). Also, the generator frequency is varied until such time as the desired nodal line pattern appears at the right plate half. Subsequently, the frequency $f_2$ of this oscillation is measured in the above described manner.

Normally, instead of using a single exciter and transferring it after completion of the 1st step A from the left to the right plate half, two exciters are rather used, one being placed at each plate half from the start, so that, although the testing is conducted with only one exciter at a time, as above described, the other one remains in rest position, saving the trouble of transfer of the exciter.

To determine the particular resonance nodal frequency, both sides of the axis of symmetry of the plate are vibrated over a range of frequencies, including frequencies above and below a value equal to half the selected frequency to determine the occurrence of vibrations on one side and then on the other side of the axis of symmetry. The visual surface pattern produced by the sand at a respective frequency indicated when a resonance frequency has been reached, namely when a number of nodal lines running in the same direction are produced on the surface of the workpiece and run approximately at right angles to the direction of the selected axis of symmetry.

Figure 8:
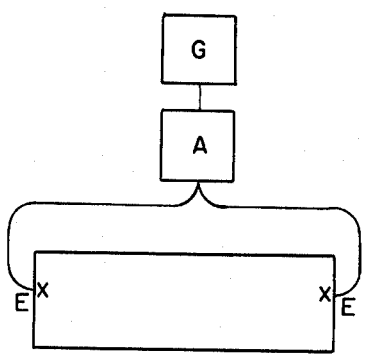
FIG. 8 illustrates schematically a second method of connecting and operating exciters, namely, simultaneously to both plate halves.

(2) In the second method, the operator works simultaneously with two exciters. At both plate halves, e.g., at both narrow ends, one each of two oscillation exciters $E_1$ and $E_2$ are positioned and both exciters are connected to the same generator G and amplifier A (see FIG. 8). Both exciters are put into operation at the same time and at the same frequency. This frequency is constantly varied by the generator until such time as the desired oscillation corresponding to the visible desired node pattern occurs, first on the one plate half and then at the other plate half if a flaw is present.

Thus, in the second method, the two exciters are operated simultaneously at the same frequency (varied by the generator), while the oscillations occur successively in the two plate halves if a frequency difference occurs, indicating the presence of a flaw. The results derived from the frequency measurements are the same as in method #1 above.

An important advantage of the process according to the invention is that the test piece can be examined continuously over its entire extent except at the places where it is supported. Further, the time required for measurement is short. The condition of the surface, e.g., if it is oxidised or covered with scale, is of no effect and the same applies to the temperature of the test piece. The method described is suitable for the examination of elastic workpieces in their finished dimensions, having at least one axis of symmetry such as, for example, rectangular plates, profiled bodies and pipes.

In the course of operation it is frequently desired to locate the faulty places, for example in a sheet rolling mill before the shears, in order to take into account the position of the fault when making the cut. In making the cut only the extent of the fault at right angles to the direction of cut is of interest, so that the locating of the fault can, therefore, be limited to this direction. The method in accordance with the invention which is hereinafter described enables such faults to be located with the aid of resonance oscillations. In this method, the examination of the test piece extends only over individual sections or strips of the work to be examined, but the same conditions as regards shape and symmetry must be fulfilled as in the above-described examination of the entire test piece. If long plates are to be examined, narrow rectangular transverse strips are selected and are set into oscillation in such a way that the nodal lines run in the longitudinal direction of the transverse strips, that is to say at right angles to the longitudinal direction of the entire plate. These nodal lines may likewise be crossed by other nodal lines at the most in the vicinity of the axis of symmetry of the partial surface and therefore in the case of a rectangular transverse strip, at the most at the place where its transverse axis, the direction of which coincides with the longitudinal axis of the entire plate, is situated. In this testing process positive forces are exerted on the boundary edges of the strip in question whereby these edges are held fast and, consequently, form nodal lines. According to the invention, for this purpose roll or roller stands can be used at the places where the two boundary lines are situated. The rolls or rollers press from both sides against the work and enable it to be transported or fed forwards at the same time, so that the test strips bounded by the rolls can be continuously examined in the course of the movement of the work. In the same way as in FIGURE 1, oscillation generators $E_1$ and $E_2$ are arranged at the two freely oscillating narrow sides of the test strip. If the nodal lines appear simultaneously, i.e., at the same resonance frequency, on both sides of the strip, then the strip in question is free from faults. If, on the other hand, a frequency difference can be measured then faults are present. By moving the work and the strip to be examined, the entire workpiece can be tested for faults.

Instead of the above-mentioned rolls or rollers which press from both sides on the work to be examined, electro-magnetic rollers arranged above or below the work can also be used. Such electro-magnetic rollers can be used with advantage with ferro-magnetic bodies to be examined, because they need be arranged only on one side, namely either only on the upper or only on the under side of the work to be examined and it is therefore not necessary to clamp the work on both sides. The magnetic rollers, owing to their magnetic effect on the test piece to be examined, likewise produce edge nodal lines along the lines of contact and the magnetic force can easily be adapted to suit the thickness and width of the work to be examined by altering the current which energises the magnets of the magnetic rollers. Further it is possible to provide magnetic rollers with their own drive so that they can also undertake the further movement of the test piece. Finally, it is also an advantage to arrange the magnetic rollers parallel to the rollers of a roller track by which the work is transported and in such a way as to be displaceable in the longitudinal as well as in the transverse direction. In this way the clamped surface of the test strip can easily be altered and can be adapted to suit the purpose for which the examination is being conducted at the time. An alteration of the distance apart of the magnetic rollers can be effected by any customary adjusting means.

The value of the relative difference in frequency or time of oscillation is, as previously mentioned, a measurement for the extent of a fault which has been found.

As compared with the examination of the entire workpiece, when parts or strips are examined in succession, the necessity for fixing the test body can be dispensed with. An advantage is the objective indication of the fault on a chart, so that a subjective observation and estimation of the nodal lines is unnecessary. In comparison with supersonic and like methods with fixed sound heads, the process of the invention has the advantages of the continuity of the examination without any gaps, the additional indication of the extent of the fault as well as its independence of a coupling liquid, of any scale which may be present and of the temperature of the work.

The above-described resonance method of fault testing requires the test piece to be firmly fixed or suspended at a few places which are symmetrical to the selected axis of symmetry.

We claim:

1. The method of non-destructive testing of elastic workpieces in the form of rectangular plates for the presence of faults, which comprises the steps of clamping the workpiece symmetrically with respect to one of its main axes of symmetry, applying loose particulate material on the workpiece to show resonance patterns, applying transverse resonance oscillations to the clamped workpiece sequentially on both sides of said one axis so as to produce corresponding nodal line patterns of such type that substantially all of the nodal lines thereof run approximately at right angles to the direction of said one axis and are intersected by at most one nodal line at the locus of said one axis, the respective resonance frequencies occurring first in one of the plate halves and then in the other plate half and corresponding to the respective nodal line patterns, the difference occurring between the two resonance frequencies serving as a criterion for the presence and size of defective places in said workpiece.

2. Method according to claim 1, said one axis of symmetry being the short transverse axis of the rectangular plate workpiece being tested.

3. The method of non-destructive testing of elastic workpieces in the form of rectangular plates for the presence of faults, which comprises the steps of clamping the workpiece symmetrically with respect to one of its main axes of symmetry, applying loose particulate material on the workpiece to show resonance nodal line patterns, connecting a frequency generator to each half of the rectangular plate on respective sides of said one axis, simultaneously operating the two frequency generators at the same frequency, varying said same frequency simultaneously in both generators to produce transverse resonance oscillations and corresponding visible resonance nodal line patterns on both sides of said axis and of such type that substantially all of the nodal lines of said pattern run approximately at right angles to the direction of said one axis and are intercepted by at most one nodal line at the locus of said one axis, whereby whenever a frequency difference occurs in the respective resonance frequencies for the respective plate halves said resonance nodal line paterns will appear sequentially first on one plate half and then on the other plate half, the difference occuring between the two resonance frequencies serving as a criterion for the presence and size of defective places in said workpieces.

4. Method according to claim 3, said one axis of symmetry being the short transverse axis of the rectangular plate workpiece being tested.

5. The method of non-destructive testing of elastic workpieces in the form of rectangular plates for the presence of faults, which comprises the steps of clamping the workpiece symmetrically with respect to one of its main axes of symmetry, applying loose particulate material on the workpiece to show resonance patterns, applying transverse resonance oscillations to the clamped workpiece on both sides of said one axis so as to produce corresponding nodal line paterns of such type that substantially all of the nodal lines thereof run approximately at right angles to the direction of said one axis and are intersected by at most one nodal line at the locus of said one axis, the respective resonance frequencies occurring first in one of the plate halves and then in the other plate half and corresponding to the respective nodal line patterns, the difference occurring between the two resonance frequencies serving as a criterion for the presence and size of defective places in said workpiece.

References Cited by the Examiner

UNITED STATES PATENTS

| | | | |
|---|---|---|---|
| 1,949,603 | 3/1934 | Davey | 73—71.3 |
| 2,486,984 | 11/1949 | Rowe | 73—67.2 |
| 2,618,970 | 11/1952 | Hitchcock et al. | 73—67.2 X |
| 2,782,632 | 2/1957 | Klein et al. | 73—67.2 |
| 2,959,268 | 11/1960 | McConnell | 198—19 |
| 3,023,609 | 3/1962 | Schubring | 73—67.2 |
| 3,039,584 | 6/1962 | McConnell | 198—19 |

OTHER REFERENCES

Proceedings of The Institution of Mechanical Engineers, vol. 168, 1954, pages 371–384, article entitled, "The Vibration of Rectangular Plates," by G. B. Warburton.

Nondestructive Testing Handbook, vol. II, edited by Robert C. McMaster, published in 1959 by The Ronald Press Co., N.Y.; Sec. 51, pages 13 and 14.

RICHARD C. QUEISSER, *Primary Examiner.*

JOHN P. BEAUCHAMP, *Examiner.*